Figure 7:
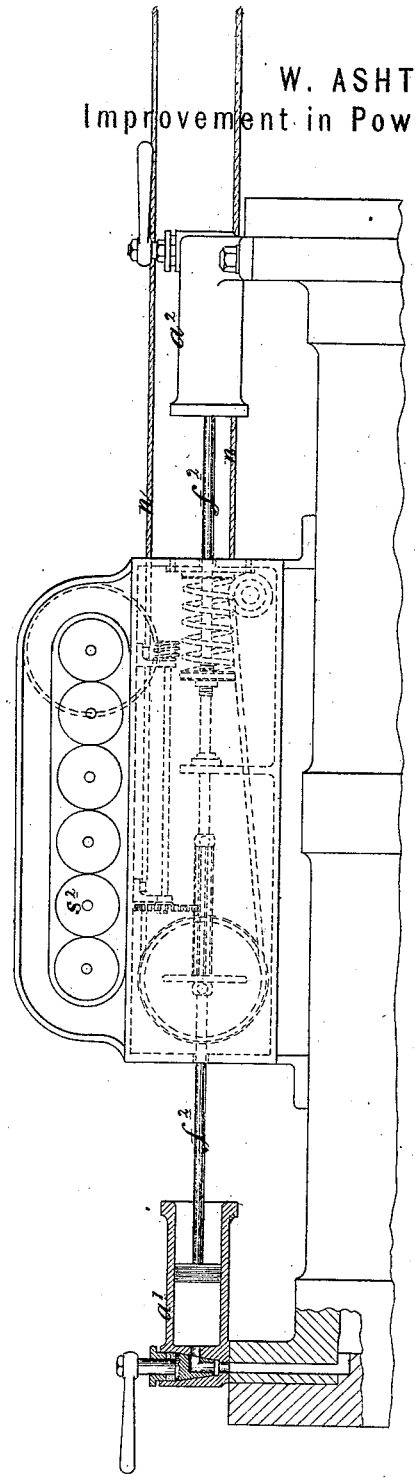

W. ASHTON & J. H. STOREY.
Improvement in Power-Indicator for Steam-Engines.
No. 127,729. Patented June 11, 1872.
4 Sheets--Sheet 1.
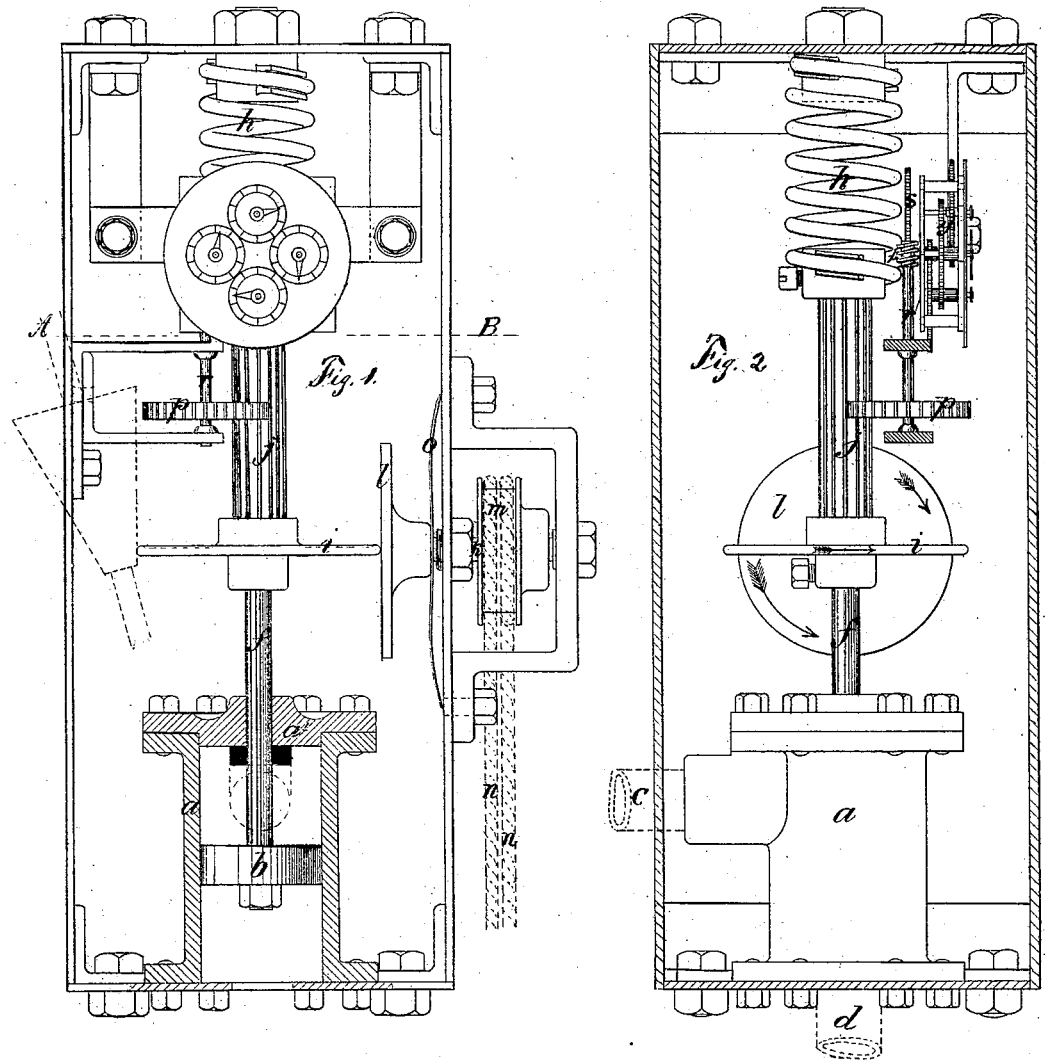
Fig. 3.
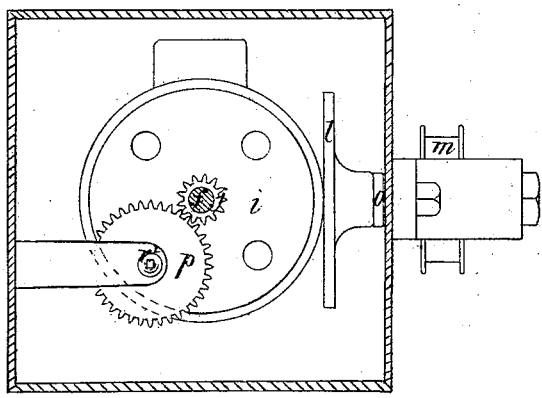
William Ashton
John Henry Storey
Edward K. Dutton
N. Rogerson.

W. ASHTON & J. H. STOREY.
Improvement in Power-Indicator for Steam-Engines.
No. 127,729. Patented June 11, 1872.
4 Sheets--Sheet 2.
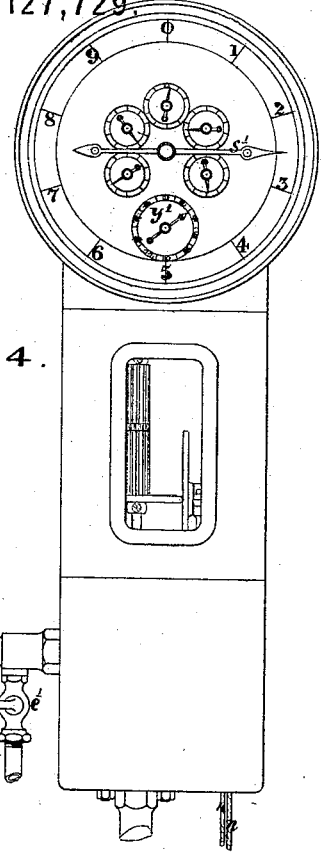
FIG. 4.
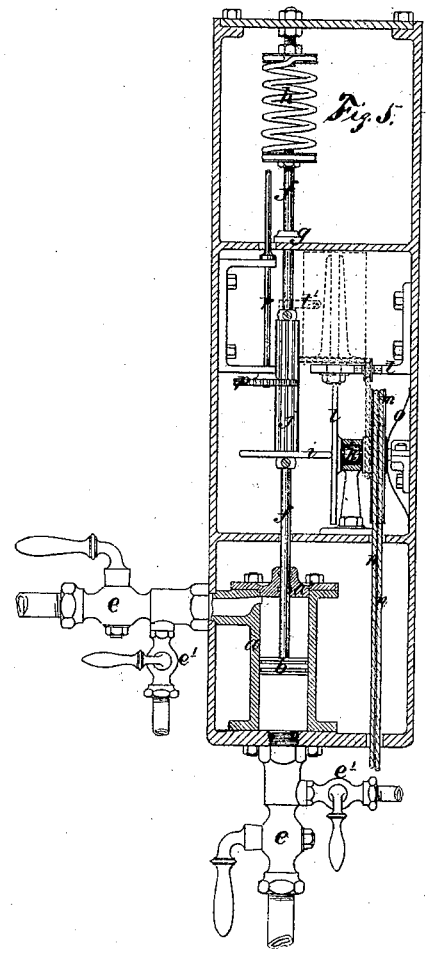
Fig. 5.
FIG. 6.
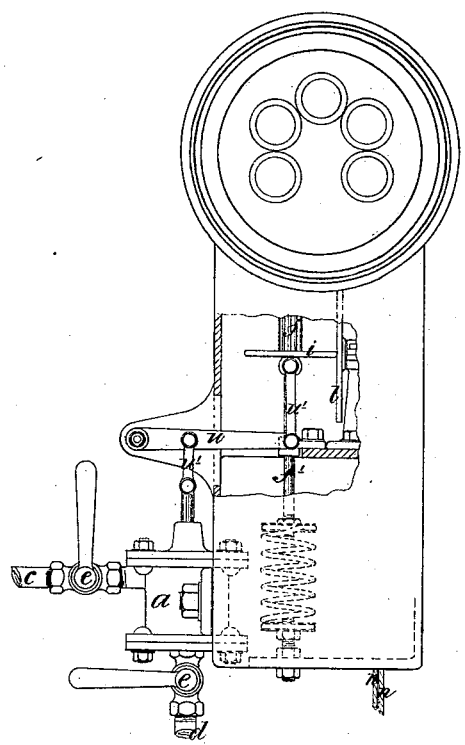
William Ashton
John Henry Storey
Edward K. Dutton
N. Rogerson W. ASHTON & J. H. STOREY.
Improvement in Power-Indicator for Steam-Engines.
No. 127,729. Patented June 11, 1872.

4 Sheets--Sheet 3.

William Ashton
John Henry Storey

W. ASHTON & J. H. STOREY.
Improvement in Power-Indicator for Steam-Engines.
No. 127,729. Patented June 11, 1872.

4 Sheets--Sheet 4.

William Ashton
John Henry Storey

Witnesses
William Dempster
Joseph Robinson 127,729

UNITED STATES PATENT OFFICE.

WILLIAM ASHTON AND JOHN HENRY STOREY, OF MANCHESTER, KINGDOM OF GREAT BRITAIN.

IMPROVEMENT IN POWER-INDICATORS FOR STEAM-ENGINES.

Specification forming part of Letters Patent No. 127,729, dated June 11, 1872.

We, WILLIAM ASHTON and JOHN HENRY STOREY, both of Manchester, in the county of Lancaster, Kingdom of Great Britain, have invented certain Improvements in Apparatus for Ascertaining and Indicating the Duty of Steam-Engines, of which the following is a specification:

Nature and Objects of the Invention.

Our invention relates to apparatus employed to ascertain the amount of force or power exerted by a steam-engine in a given time. When using the ordinary indicators for the above purpose, indicator-diagrams are taken at intervals, and form the basis of calculations by means of which the duty of the steam-engine is ascertained, these means furnishing only an approximation to the correct amount of duty. Our improved indicator measures the force exerted by the engine during each stroke of the piston, and registers the amount upon a dial, from which the amount of duty may be read off at intervals, the readings of the dial showing the aggregate amount of duty of all the strokes of the piston during the said intervals. A small cylinder, fitted with a piston, is connected by means of pipes with the cylinder of the engine, so that the said piston moves to and fro simultaneously with the piston of the engine, a spring governing the extent of motion of the small piston, as in the case of the ordinary indicator. On the indicator piston-rod, or on a rod connected therewith, is mounted a friction-wheel or pinion, which is caused to revolve during the working of the engine by means of a disk, which is caused to revolve at a speed proportionate at all times to the speed of the engine-piston. During the working of the engine the steam pressure, acting on the indicator-piston, causes the friction-pinion to be traversed along the face of the disk to an extent proportionate to the said pressure, and the disk will cause the friction-wheel or pinion to revolve to an extent proportionate to the multiple of the speed of the engine-piston and the pressure on the same, the direction of revolution of the said disk being reversed at the end of each stroke of the engine-piston.

Description of the Accompanying Drawings.

Figure 8:
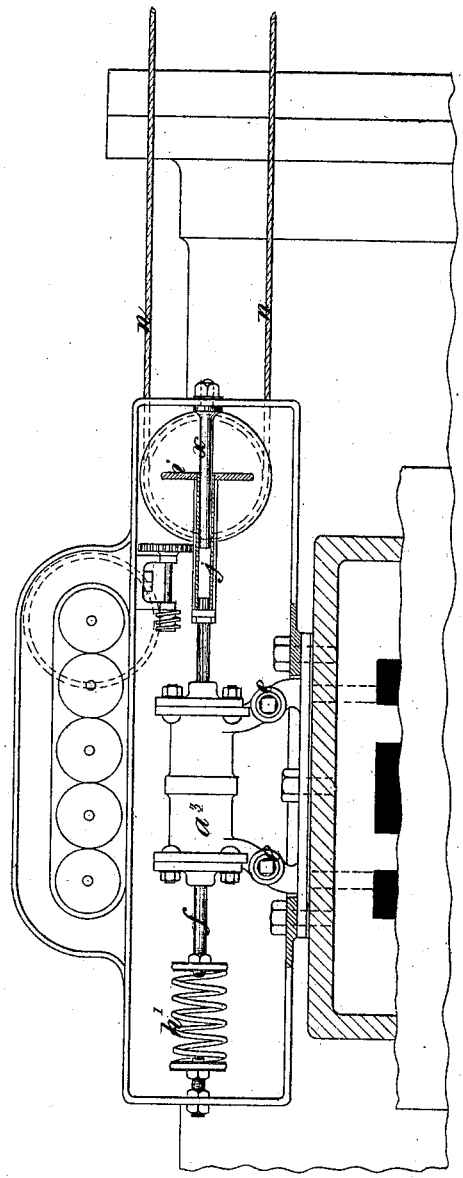
Figure 5:
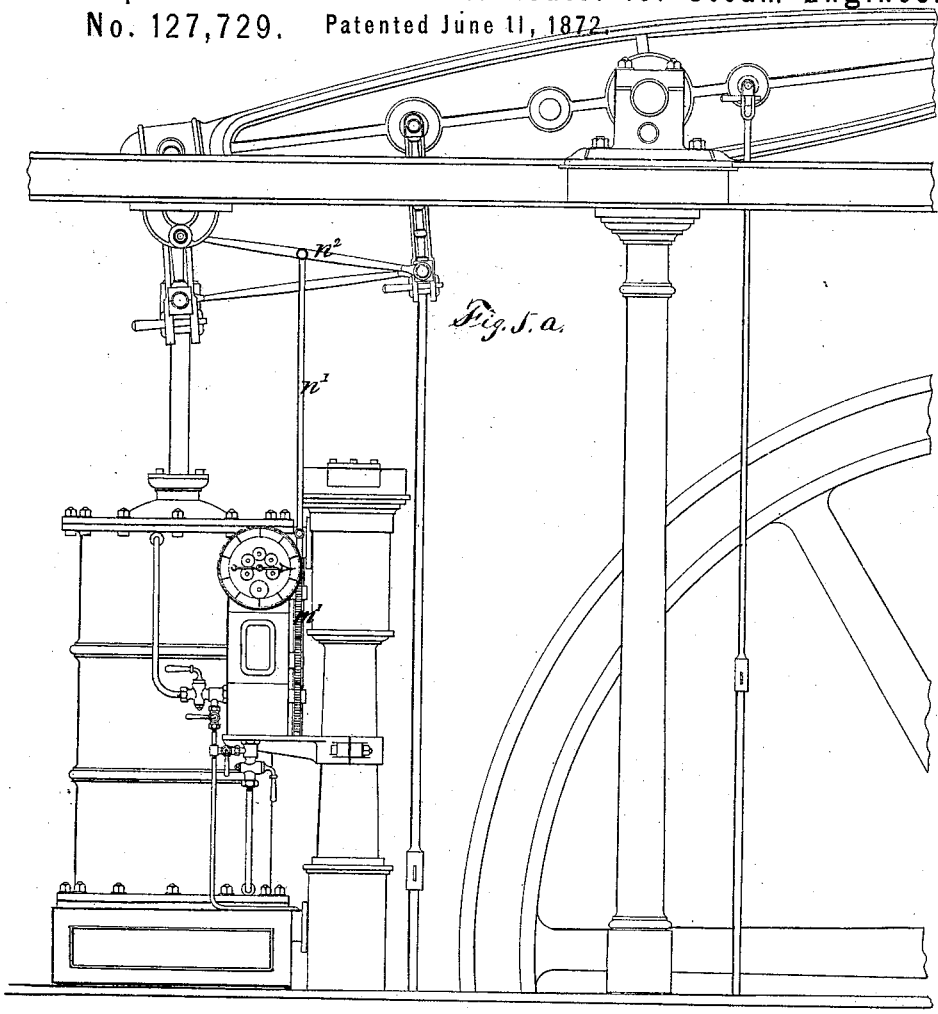

Figure 1 is a sectional elevation of the model, drawn about two-thirds of the full size. Fig. 2 is a side sectional elevation thereof. Fig. 3 is a cross-section on the line A B in Fig. 3. Fig. 4 is a front elevation, and Fig. 5 a sectional elevation, of the complete apparatus as now being made in Great Britain. Fig. 5a represents the apparatus as applied to a steam-engine. Figs. 6, 7, and 8 represent modifications which may be made in the apparatus.

General Description.

Figure 5C:
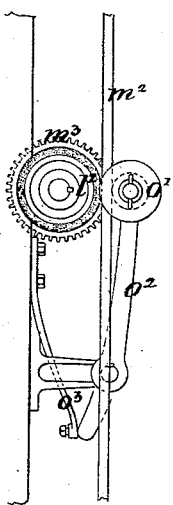
Figure 5D:
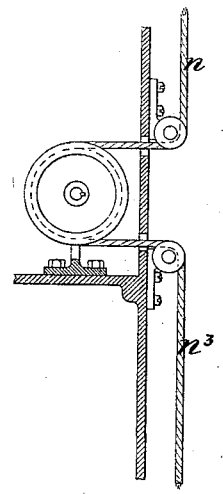
Figure 5B:
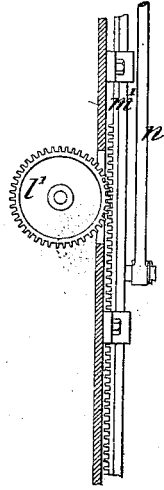

In the said figures, $a$ is a small steam-cylinder, which is fitted with a piston, $b$. The space above the piston is connected by means of the pipe $c$ (shown in dotted lines in Fig. 1) with one end of the engine-cylinder, as shown in Fig. 5a, and the space below the piston is connected by means of the pipe $d$ with the other end of the engine-cylinder, so that there may be about the same force per square inch acting on the piston $b$ as on the engine-piston. The piston-rod $f$ is continued upward through the cover $a^1$ and the bearing $g$, and the upper end thereof is attached to the spiral spring $h$, the said spring offering an increasing resistance to the motion of the piston in either direction from the central position, as shown in the drawing. On the said piston-rod is mounted a friction-wheel or pinion, $i$, which is attached to the long pinion $j$, and is free to revolve on the said rod. On the shaft $k$, which is fitted to revolve in suitable bearings, is fixed or formed the flat circular disk $l$, and also the band-pulley $m$, which receives a rotary motion from the engine by means of cords $n$ $n$, for which purpose one of the said cords may be connected with the piston-rod cross-head, or with some other portion of the engine moving at the same speed as the engine-piston, or at a proportionate speed thereto, the other cord being attached to a spring or to a weight; or the said cords may be joined into an endless band and be connected with a moving portion of the engine, as aforesaid; or other arrangements for giving motion to the disk may be adopted, one of the alternative arrangements being illustrated by Fig. 5b. In this case a spur-wheel, $l^1$, is fixed on the same spindle as the aforesaid disk $l$, and a rack, $m^1$, is fitted to slide up and down, and to gear with the said spur-wheel. A connecting-rod, $n^1$, takes hold of a stud on the back of the rack, the other end of the said rod being jointed (in the example given in Fig. 5a) to one of the radius links $n^2$. The said rack is thus caused to slide up and down during the working of the engine, the speed of movement of the rack being always in proportion to that of the engine-piston. As the rack gears with the spur-wheel $l^1$, the disk $l$ is caused to revolve in one direction—say in the direction indicated by the long arrow—when the engine-piston is moving upward, and in the contrary direction (indicated by the short arrow) when the said piston is moving downward. In Fig. 5c a smooth bar, $m^2$, is substituted for the rack. A wheel, $l^2$, is covered with vulcanized caoutchouc, and the said bar is pressed against the said wheel by means of a bowl, $o^1$, which is mounted on a lever-arm, $o^2$, the said bowl being pressed against the bar by means of the spring $o^3$, which acts on the lower end of the said lever-arm. As the bar $m^2$ moves up and down it imparts, by frictional contact, a to-and-fro rotary motion to the wheel $l^2$. The said wheel may either be fixed on the said spindle as the disk $l$, or a spur-wheel, $m^3$, may gear with a spur-wheel fixed on the same spindle as the disk $l$. In Fig. 5d the aforesaid cords $n$ $n$ are represented. If the cord $n$ be attached to the link $n^2$, in Fig. 5a, and the cord $n^3$ to a spring or weight, in order to keep the said cord tight, the same effect is obtained as when the rack $n^1$ is used; but the cord is not so durable. The method of connecting the apparatus to the engine, and of obtaining the to-and-fro revolving motion of the disk $l$, may vary, according to the classes of engines and to peculiarities in the engines to which the apparatus may be applied.

The action of the apparatus, when applied to an engine of the class represented in Fig. 5a, may be described as follows: We must premise that when the piston $b$ is not acted upon, the friction-wheel $i$ rests opposite the central axis of the disk $l$, so that if the said disk were then caused to revolve no motion would be communicated to the wheel $i$. On steam being admitted to the upper end of the engine-cylinder the said steam will flow through the pipe $c$, and, entering the upper end of the cylinder $a$, will depress the piston $b$ until the resistance of the spring $h$ balances the pressure of the steam upon the said piston. If a vacuum be formed below the engine-piston a corresponding vacuum is at the same time formed below the piston $b$, and the depression of the last-named piston is increased to a corresponding extent. The depression of the piston $b$ will cause the friction-wheel $i$ to move downward from the center of the disk $l$ toward its circumference. When the engine-piston commences its downward movement the disk $l$ will commence to rotate, say, in the direction of the shorter arrow, and as the said disk is pressed against the edge of the friction-wheel $i$ by the spring $o$, a revolving motion is imparted to the said wheel $i$, the extent of revolution of the wheel $i$ during a single stroke of the engine-piston being in proportion to the average distance of the said wheel from the center of the disk $l$ during the said stroke. The revolving motion of the disk $l$ and wheel $i$ continue in the said direction until the piston has reached the end of its downward stroke. The steam will now be "shut off" from the upper end of the cylinder and be admitted to the lower end thereof, and will flow through the pipe $d$ into the cylinder $a$, and will act on the lower side of the piston $b$, driving the said piston toward the upper end of the cylinder and compressing the spring $h$. The wheel $i$, by the said movement of the piston, is caused to cross the center of the disk $l$ and to move upward toward the higher part of the circumference of the said disk. The engine-piston, on commencing its upward stroke, causes the disk $l$ to reverse its direction of revolution and to revolve in the direction indicated by the long arrow; but as the wheel $i$ has crossed the center of the said disk, the revolving motion imparted to the said wheel continues in the same direction as when the engine-piston was moving downward. It will thus be seen that, so long as the engine-piston continues to reciprocate "up and down," the disk $l$ will continue to rock to and fro on its axis and the wheel $i$ will continue to revolve in one direction. As the distance of the wheel $i$ from the center of the disk $l$ is at all times in relative proportion to the force acting on the engine-piston during its upward and downward strokes, and varies in proportion with the variation of the said force, the said wheel moving further from or nearer to the center of the said disk as the said force increases or decreases, and as the speed of revolution of the disk $l$ is at all times proportionate to the speed of movement of the engine-piston, it follows that the extent of revolution of the wheel $i$ during any stroke of the engine-piston will be as a multiple of the force acting on the said piston, and of the extent of movement of the said piston, disregarding friction and slight causes of error—that is to say, the said extent of revolution will represent "pressure" multiplied by "speed." The pinion $j$ gears with the wheel $p$, fixed on the vertical spindle $r$, a worm, $r'$, on the upper end of the spindle, gearing with a worm-wheel, $s$, which gives motion to the train of gearing in order to register the amount of revolution of the friction-wheel or pinion.

Figs. 4 and 5, on Sheet 2, drawn about a quarter of the full size, represent a more suitable form of the apparatus than hitherto described. The pipes connected with the cylinder are fitted with stop-cocks or valves $e$ $e$ and with jet-cocks $e'$ $e'$ to admit of the discharge of water from the cylinder and connecting-pipes. The worm on the upper end of the spindle gears with a wheel fixed on the same arbor as the unit-index $s^1$. The units indicated by the said index may be units of horse-power exerted by the engine; or each unit may represent a number of "foot-pounds" for each square or circular inch of the engine-piston's area; or each unit may bear any other desired proportion to the duty of the engine, according as may be desired. For general purposes we have found it convenient to so proportion the gearing between the friction-wheel and the index as that each unit shall represent one thousand foot-pounds on each circular inch of the engine-piston. The method of registering the number of revolutions of the friction-wheel may be considerably modified without departing from the main principle of action of the apparatus. The smaller indexes register the duty of our engine to the higher places of figures, as will be well understood. In order that the duty of the engine may be ascertained at any time by a mere reference to the dial of the instrument we sometimes provide a supplementary index, shown at $y'$ in Fig. 4. The indication of the said index during the space of one minute is made to be the number of horse-power per hour exerted by the engine; as, for example, if the index shown in the drawings were to make a complete revolution in exactly one minute, the indication would be twenty-horse power. The apparatus may also be employed to furnish a diagram on paper similar to the ordinary indicator-diagrams. For this purpose a cylinder to hold the paper, shown by dotted lines in Fig. 5, is mounted on the bracket $t$, and is capable of revolving on a central spindle, as is usual, being actuated in the ordinary manner, or by means of a cord attached to the boss of the pulley $m$, as shown. The pencil or tracing-point is shown at $t'$, and is attached to the piston-rod $f$. By closing the lower tap a diagram of the down-stroke may be taken, and by closing the upper tap and opening the lower one a diagram of the up-stroke may be taken without having to move the apparatus.

The remaining figures, drawn about quarter size, illustrate some of the modifications which may be made in the apparatus. In Fig. 6 the piston-rod of the indicator is connected to the sliding rod $f^1$ by the lever $u$ and the links $u'$. In this example the movement of the rod $f^1$ is much greater than that of the piston, and the area of the said piston is proportionately increased, this arrangement being of advantage in some cases. In Fig. 7 two single-acting pistons are employed, working in cylinders $a^2$ $a^2$, fixed to each end of the cylinder, and connected together by the rod $f^2$. This arrangement is designed to shorten the steam-passages. In this example a different arrangement of the indexes $s^2$ is shown. In Fig. 8 the cylinder $a^3$ is connected with the steam-passages of the engine-cylinder by means of the passages and taps $e'$ $e'$, and the piston-rod passes through both ends of the cylinder, being connected by one end to the spring $h'$ and by the other end to the long pinion $j$, which slides on a fixed stud, $u$, and carries the friction-wheel $i$.

Claim.

In combination with the counter-wheel $p$, the pinion $j$ and attached friction-wheel $i$, revolving upon and carried by the reciprocating piston-rod $f$ and the disk $l$, when all arranged and made to operate conjointly to indicate the power of an engine, substantially in the manner herein set forth.

WILLIAM ASHTON.
JOHN HENRY STOREY.

Signed in the presence of—
WILLIAM DEMPSTER,
JOSEPH ROBINSON.